UNITED STATES PATENT OFFICE.

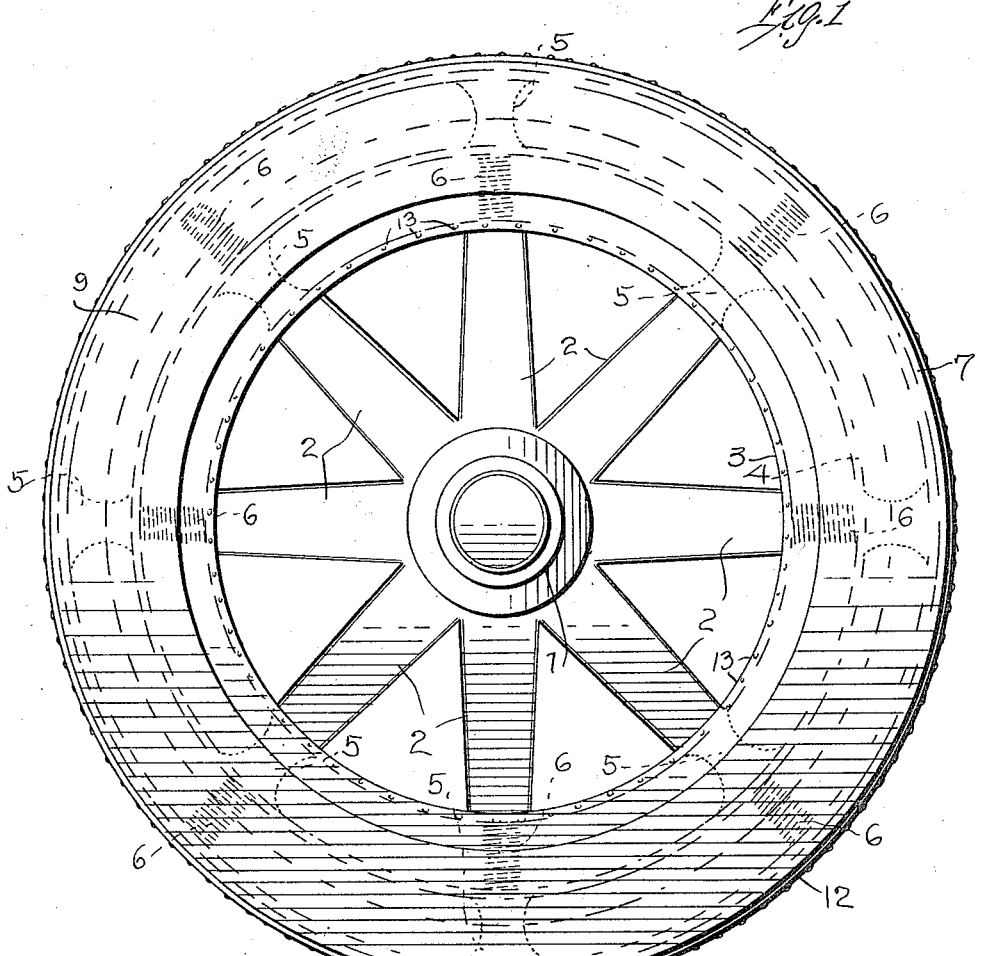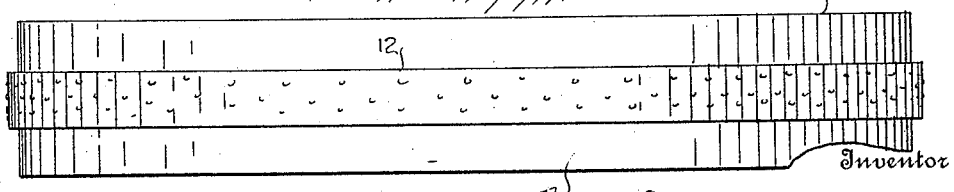

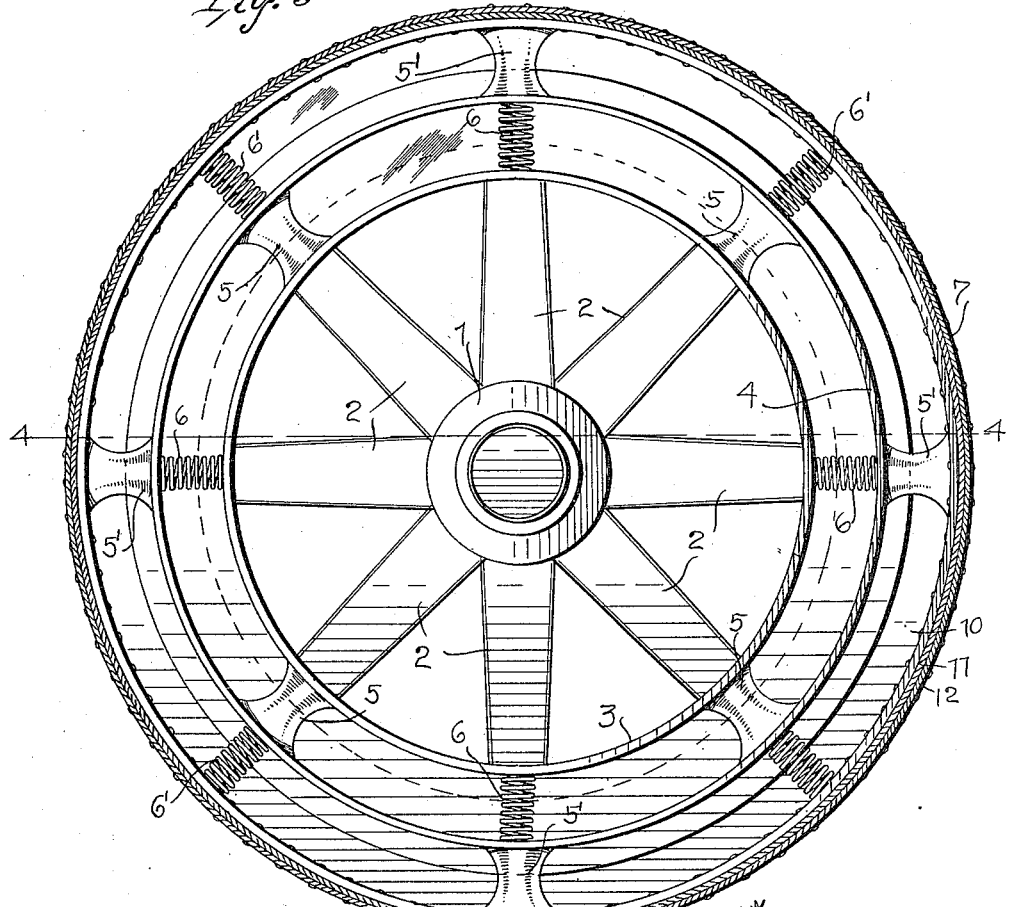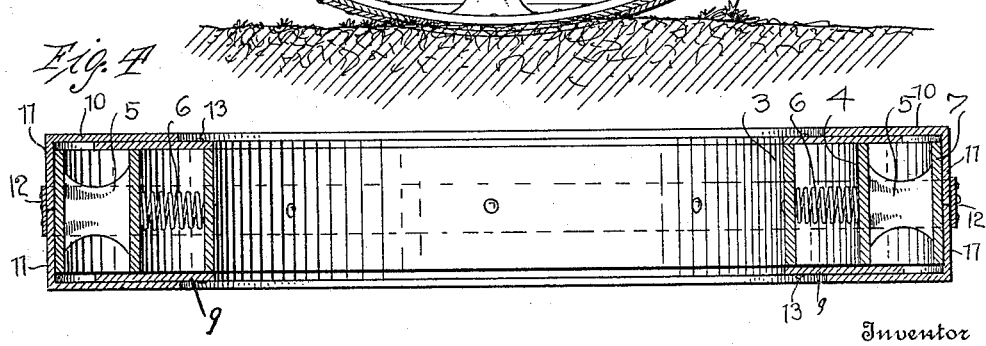

OLE G. RUGTWET, OF LONGMONT, COLORADO.

STEEL-SPRING AUTOMOBILE-TIRE.

1,068,532.  Specification of Letters Patent.  Patented July 29, 1913.

Application filed December 4, 1912. Serial No. 734,947.

*To all whom it may concern:*

Be it known that I, OLE G. RUGTWET, a citizen of the United States, residing at Longmont, in the county of Boulder and State of Colorado, have invented certain new and useful Improvements in Steel-Spring Automobile-Tires, of which the following is a specification, reference being had to the accompanying drawings.

This invention relates to vehicle wheels and has special reference to vehicle wheels so constructed and arranged as to be resilient and to provide a cushioning effect whereby the vehicle is relieved from any shock or jar.

The invention has for its primary object to provide an improved resilient wheel for vehicles so constructed and arranged that the various parts may be readily put together and taken apart and which will be effective in operation and will provide a cushioning support for the body of the vehicle.

Another object of the invention is to provide a device of this character which will possess advantages in points of efficiency and durability, is inexpensive to manufacture and at the same time is simple in construction and operation.

With the above and other objects in view, the invention consists in the novel features of construction and the combination and arrangement of parts to be hereinafter more fully described, pointed out in the claim and shown in the accompanying drawings, in which—

Figure 1 is a side elevation of a spring wheel constructed in accordance with my invention. Fig. 2 is a top plan view. Fig. 3 is a vertical sectional view, and Fig. 4 is a transverse sectional view taken on the line 4—4 of Fig. 3.

Referring more particularly to the drawings, 1 indicates the hub which is provided with a plurality of radially projecting spokes 2. Mounted upon the outer ends of the spokes and arranged in concentric relation with the hub is a rim 3 which constitutes the main rim of the wheel. Arranged in concentric spaced relation with the rim 3 is a second rim 4, and disposed between the rims 3 and 4 are the brace members 5 which are arranged at diametrically opposite points and in alinement with the spokes 2. Alternately arranged between the brace members 5 and disposed between the rims 3 and 4 are the coil springs 6, said coil springs being also arranged in alinement with the ends of the spokes between the brace members.

Arranged in concentric relation with the rim 4 is the outer rim 7 and alternately arranged between the rims 4 and 7 is a second series of the brace members 5' which are disposed in alinement with the coil springs arranged between the rims 3 and 4. Alternately arranged between the brace members 5' is a second series of coil springs 6' which are disposed in alinement with the brace members 5 so that any weight upon the body of the wheel will be distributed throughout the entire wheel, thus preventing any sudden shock or jar to the body of the vehicle.

In order to prevent the dust and dirt from accumulating between the rims 3, 4 and 7, I provide a suitable casing 8 which is formed of the telescoping sections 9 and 10, the outer section being provided with the angular portions 11, which project over the periphery of the wheel and are securely fastened together by means of the strap 12, the rivets securing said strap extending through the outer rim 7. The inner edges of the sections 9 are secured to each side of the rim 3 by means of the screw bolts 13. Thus it will be apparent that the casing may be readily removed to gain access to various parts of the wheel by the removal of the bolts 15 and it will be seen that the brace members and coil springs can be readily removed and the entire wheel easily taken apart.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

In a device of the character described, the combination of a hub, a plurality of spokes radially projecting therefrom, a rim mounted on the outer ends of said spokes, a second rim arranged in spaced relation with the first, a third rim arranged in spaced relation with the second, brace members arranged in alternate spaced relation between said rims, resilient members arranged in alternate spaced relation between said rims, a sectional casing, angular portions formed upon the outer of said sections and disposed over the periphery of the wheel, means for securing said portions together, and screw bolts securing the inner edges of the inner sections to the first rim of the wheel.

In testimony whereof I hereunto affix my signature in the presence of two witnesses.

OLE G. RUGTWET.

Witnesses:
 LYLEA BOWMAN,
 GRAY SECOR,

Copies of this patent may be obtained for five cents each, by addressing the "Commissioner of Patents, Washington, D. C."